(12) United States Patent
Komori (10) Patent No.: US 9,800,456 B2
(45) Date of Patent: Oct. 24, 2017

(54) ON-BOARD NETWORK SYSTEM

(71) Applicant: DENSO CORPORATION, Kariya, Aichi-pref. (JP)

(72) Inventor: Syota Komori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 755 days.

(21) Appl. No.: 13/970,942

(22) Filed: Aug. 20, 2013

(65) Prior Publication Data
US 2014/0068099 A1    Mar. 6, 2014

(30) Foreign Application Priority Data
Aug. 28, 2012    (JP) .................................. 2012-187555

(51) Int. Cl.
| | | |
|---|---|---|
| *G06F 15/16* | (2006.01) | |
| *H04L 29/10* | (2006.01) | |
| *H04L 12/741* | (2013.01) | |

(52) U.S. Cl.
CPC ............ *H04L 29/10* (2013.01); *H04L 45/745* (2013.01)

(58) Field of Classification Search
CPC ..................................................... H04L 47/10
USPC ........................................................ 709/236
See application file for complete search history.

(56) References Cited

U.S. PATENT DOCUMENTS

| | | | | |
|---|---|---|---|---|
| 6,782,428 B1 * | 8/2004 | Gleeson | .................. | H04L 47/10 370/395.21 |
| 8,891,543 B1 * | 11/2014 | Tripathi | .................. | H04L 45/66 370/412 |
| 2006/0007917 A1 | 1/2006 | Saito et al. | | |
| 2007/0030844 A1 | 2/2007 | Fukuta et al. | | |
| 2010/0246583 A1 * | 9/2010 | Morinaga | ........... | H04L 41/0631 370/392 |

FOREIGN PATENT DOCUMENTS

| | | |
|---|---|---|
| JP | 2006-025121 | 1/2006 |
| JP | 2008-099014 | 4/2008 |
| JP | 2010-251837 | 11/2010 |
| JP | 2011-101115 | 5/2011 |

OTHER PUBLICATIONS

Office Action dated Aug. 5, 2014 in corresponding Japanese Application No. 2012-187555.

* cited by examiner

*Primary Examiner* — Kevin Bates
*Assistant Examiner* — Emad Siddiqi
(74) *Attorney, Agent, or Firm* — Harness, Dickey & Pierce, P.L.C.

(57) ABSTRACT

There is provided a new on-board network system having a relay device that relays communication frames between on-board networks, and between an on-board network and an external device, such as being capable of supporting communication between an on-board network and an external device without a storage area of a relay device being increased.

5 Claims, 10 Drawing Sheets

FIG.1

| PORT IDENTIFIER (INPUT DESTINATION) | MESSAGE IDENTIFIER | PORT IDENTIFIER (OUTPUT DESTINATION) |
|---|---|---|
| PORT120 | IDENTIFIER 1 FOR MESSAGE ADDRESSED TO ECU 102 | PORT121 |
| PORT120 | IDENTIFIER 2 FOR MESSAGE ADDRESSED TO ECU 102 | PORT121 |
| ... | ... | ... |
| PORT120 | IDENTIFIER 1 FOR MESSAGE ADDRESSED TO ECU 103 | PORT122 |
| ... | ... | ... |
| PORT120 | IDENTIFIER 1 FOR MESSAGE ADDRESSED TO ECU 104 | PORT123 |
| ... | ... | ... |
| PORT121 | IDENTIFIER 1 FOR MESSAGE ADDRESSED TO DIAGNOSTIC TESTER | PORT120 |
| ... | ... | ... |
| PORT121 | IDENTIFIER 1 FOR MESSAGE ADDRESSED TO DIAGNOSTIC TESTER | PORT120 |
| ... | ... | ... |
| PORT121 | IDENTIFIER 1 FOR MESSAGE ADDRESSED TO DIAGNOSTIC TESTER | PORT120 |
| ... | ... | ... |
| PORT122 | IDENTIFIER 1 FOR MESSAGE ADDRESSED TO DIAGNOSTIC TESTER | PORT120 |
| ... | ... | ... |
| PORT122 | IDENTIFIER 1 FOR MESSAGE ADDRESSED TO DIAGNOSTIC TESTER | PORT120 |
| ... | ... | ... |
| PORT122 | IDENTIFIER 1 FOR MESSAGE ADDRESSED TO DIAGNOSTIC TESTER | PORT120 |
| ... | ... | ... |

ALL PIECES OF INFORMATION USED TO RELAY MESSAGES SENT AS REQUEST FROM EXTERNAL DEVICE TO ECU

ALL PIECES OF INFORMATION USED TO RELAY MESSAGES SENT IN RESPONSE FROM ECU TO EXTERNAL DEVICE

⟨CONVENTIONAL TECHNOLOGY⟩

ON-BOARD NETWORK SYSTEM

CROSS-REFERENCE TO RELATED APPLICATION

This application is based on and claims the benefit of priority from earlier Japanese Patent Application No. 2012-187555 filed Aug. 28, 2012, the description of which is incorporated herein by reference.

BACKGROUND OF THE INVENTION

Technical Field

The present invention relates to an on-board network system having a relay device that relays communication frames between on-board networks, and between an on-board network and an external device.

Description of the Related Art

Conventionally, numerous electronic control units (ECUs) are mounted in a vehicle to control on-board devices. A plurality of on-board networks are constructed by each ECU being disposed on any of a plurality of communication buses. A relay device is connected to the plurality of communication buses to enable the ECUs to transmit and receive communication frames even between on-board networks.

In addition, in general, the communication frame includes a message and a message identifier. The message indicates various detection values indicating the state of the vehicle, commands issued to another ECU, and the like. The message identifier is used to identify the type of message. Each ECU judges whether or not to receive a message based on the message identifier in the communication frame.

In a configuration such as this, the relay device has a plurality of communication ports for transmitting and receiving communication frames. The relay device also stores therein a routing table in which the message identifier is associated with a port identifier (identifier for identifying the communication port that is the output destination of the communication frame). The relay device determines the communication port that is the output destination based on the message identifier in the communication frame (refer, for example, to JP-A-2008-99014).

When an ECU diagnosis is performed, an external device, such as a failure diagnosis device, provided in a repair shop or the like is used. This type of failure diagnosis device is ordinarily connected by wire to a connector (and ultimately the communication port) provided in a vehicle in the repair shop or the like. As a result, the failure diagnosis device is able to communicate with the ECUs via the relay device. The failure diagnosis device acquires various pieces of information from the ECUs and updates data within the ECUs.

Figure 1:
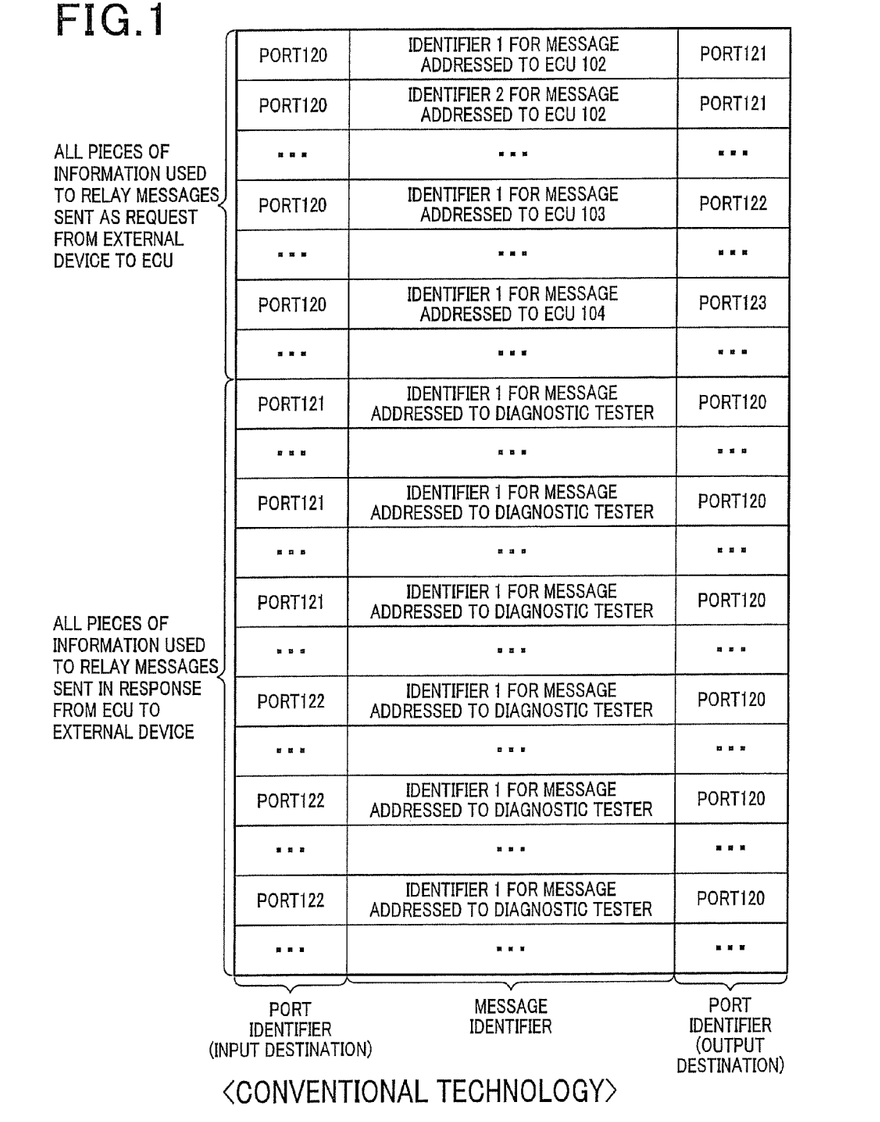
FIG. 1 shows a diagram of overloading of a storage area in a prior art.

However, in the conventional configuration, when relaying communication frames between the external device such as that described above and an on-board network, the relay device uses the routing table. Therefore, as shown in FIG. 1 for example, a message identifier and a port identifier are required to be stored for each type of message sent as a request from the failure diagnosis device to the ECU. A message identifier and a port identifier are also required to be stored for each type of message sent in response from the ECU to the failure diagnosis device.

Therefore, an enormous amount of content is stored in the routing table. A problem occurs in that the amount of content cannot be supported without the memory area of the relay device being increased. In addition, for example, the storage area of the relay device is required to be further increased and the routing table is required to be updated, not only for pre-existing external devices such as the failure diagnosis device, but also every time a new external device capable of communicating with the ECUs via the relay device is installed.

Therefore, a network system is desired that is capable of supporting communication between an on-board network and an external device without a storage area of a relay device being increased.

SUMMARY

As an exemplary embodiment, the present application provides a network system having a relay device that relays communication frames between on-board networks, and between an on-board network and an external device. In the network system, the communication frames are comprised of at least: a first communication frame that is transmitted and received within an on-board network and also between the on-board network and the relay device; and a second communication frame transmitted from the external device to the relay device. The first communication frame includes at least: a first message that is received by an electronic control unit configuring the on-board network or the external device; and a first message identifier defined advance for identifying the first message. The second communication frame includes at least: a second message received by the electronic control unit; and a second message identifier defined in advance for identifying the second message.

The relay device has a plurality of communication ports for transmitting and receiving the first communication frame and the second communication frame. The relay device also stores therein a routing table in which the first message identifier related to the first communication frame is associated with a port identifier for identifying a communication port that is an output destination of the first communication frame.

On the other hand, transmission of the second communication frame from the external device to the relay device is done by at least adding the port identifier of the on-board network to which the second communication frame is to be sent, as a header, to the second message identifier included in the second communication frame.

As a result of a configuration such as this, the communication frame transmitted from the external device includes information (port identifier) identifying the communication port that is the output destination of the communication frame. Therefore, the relay device is able to transfer the communication frame to the on-board network in adherence to the port identifier.

Therefore, according to the exemplary embodiment, a message identifier and a port identifier are not required to be stored in a routing table for each type of message transmitted from an external device to an on-board network. Furthermore, communication performed between an on-board network and an external device can be favorably supported without a storage area of a relay device being increased.

DETAILED DESCRIPTION OF THE PREFERRED EMBODIMENTS

An embodiment of the present invention will hereinafter be described with reference to the drawings.
<Overall Configuration>

Figure 2:
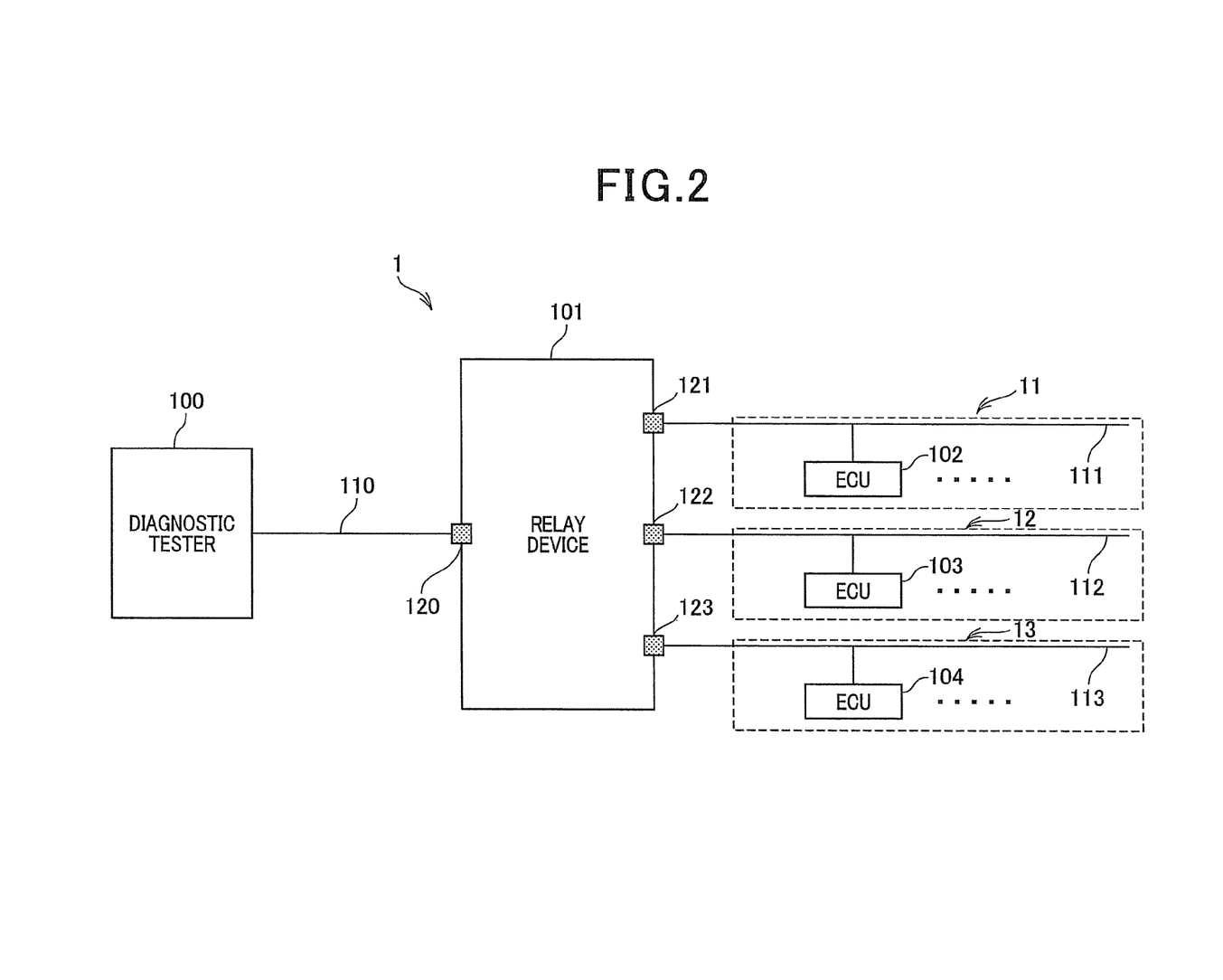
FIG. 2 shows a block diagram of an overview of a network system according to an embodiment.

FIG. 2 is a block diagram of an overview of the network system.

As shown in FIG. 2, a network system 1 includes a first on-board local area network (LAN) 11, a second on-board LAN 12, a third on-board LAN 13, a failure diagnosis device (referred to, hereinafter, as a "diagnostic tester") 100, and a relay device 101. The first on-board LAN 11 is an on-board network composed of a plurality of ECUs 102, . . . each connected to a communication line (referred to, hereinafter, as a "communication bus") 111 that is in a bus state. The second LAN 12 is an on-board network composed of a plurality of ECUs 103, . . . connected to a communication bus 112. The third LAN 13 is an on-board network composed of a plurality of ECUs 104, . . . connected to a communication bus 113. The diagnostic tester 100 is connected to a communication bus 110 as an external device. The relay device 101 connects the first on-board LAN 11, the second on-board LAN 12, the third on-board LAN 13, and the diagnostic tester 100 to each other.

The relay device 101 is an ECU that relays communication frames (sometimes referred to, hereinafter, as simply "frames") transmitted and received among the first on-board LAN 11, the second on-board LAN 12, and the third on-board LAN 13, and between the first on-board LAN 11, the second on-board LAN 12, the third on-board LAN 13, and the diagnostic tester 100. The relay device 101 has a plurality of communication ports (referred to, hereinafter, as "ports") 120 to 123 that are each used to transmit and receive communication frames between the first on-board. LAN 11, the second on-board LAN 12, the third on-board LAN 13, and the diagnostic tester 100. Specifically, the relay device 101 has the port 121 connected to the communication bus 111, the port 122 connected to the communication bus 112, the port 123 connected to the communication bus 113, and the port 120 connected to the communication bus 110.

The diagnostic tester 100 is provided at a car dealership a repair shop, a gas station, and the like and diagnoses the ECUs 102, 103, 104 . . . . Specifically, the diagnostic tester 100 is connected to the communication bus 110 via a connector (not shown) provided in the vehicle. The diagnostic tester 100 acquires various pieces of information from the ECUs 102, 103, 104 . . . via the relay device 101, and updates the data within the ECUs 102, 103, 104 . . . .

The data communication performed within the first on-board LAN 11, the second on-board LAN 12, and the third on-board LAN 13, and among the first on-board LAN 11, the second on-board LAN 12, the third on-board LAN 13 via the relay device 101 uses, for example controller area network (CAN) protocol commonly used in on-board LANs.
<Configuration of Communication Frame>

A communication frame (referred to, hereinafter, as a "first communication frame") 1A used in the first on-board LAN 11, the second on-board LAN 12, and the third on-board LAN 13 is composed of a start-of-frame, an arbitration field, a control field, a data field, a CRC field, an ACK field, and an end-of-frame. The start-of-frame indicates the start of the frame. The arbitration frame indicates the priority level of the frame and the like. The control field indicates the number of bytes of the data and the like. The data field is the substantive data to be transferred. The CRC field adds a CRC for checking for any frame error. The ACK field receives a notification (ACK) from a unit that has received a correct message. The end-of-frame indicates the end of the frame. The first communication frame 1A is well known in CAN protocol.

Figure 3:
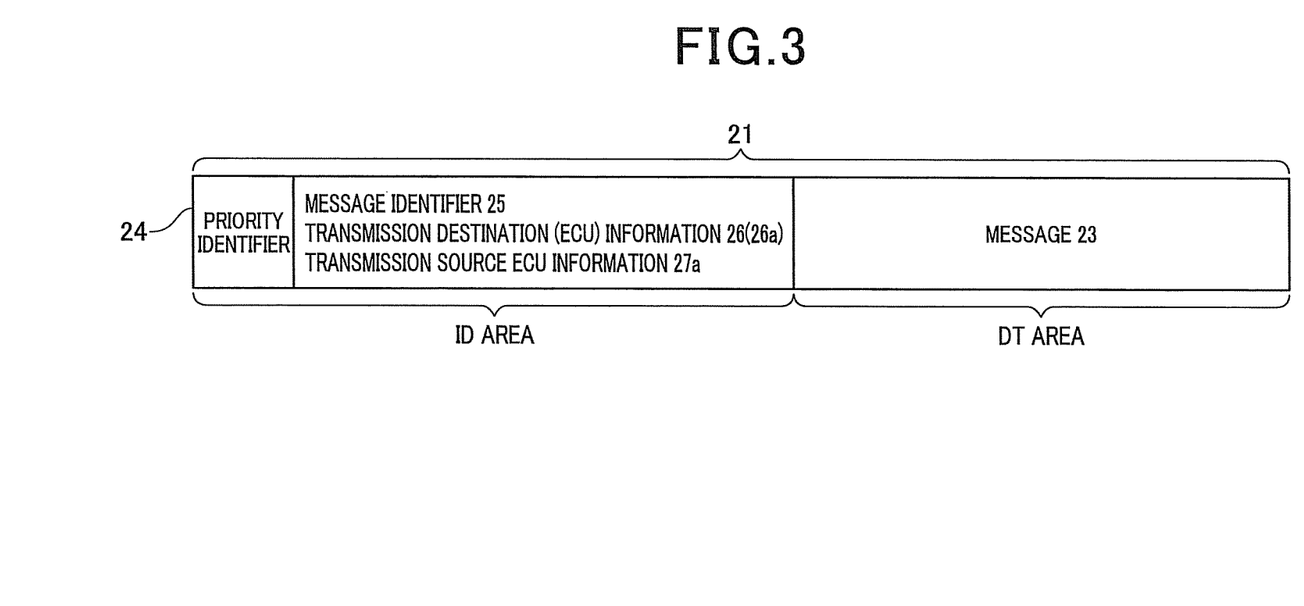
FIG. 3 shows a diagram of a configuration of a first communication frame according to the embodiment.

FIG. 3 illustrates a diagram in which an 11-bit or 29-bit arbitration field (referred to, hereinafter as an "ID area") and a 0- to 64-bit data field (referred to, hereinafter, as a "DT area") required for the following description have been extracted from a first communication frame 21.

As shown in FIG. 3, a message 23 is written in the DT area. The message 23 indicates various detection values indicating the state of the vehicle, diagnosis result of a self-diagnosis process, described hereafter, commands issued to other ECUs 102, 103, 104 . . . , and the like. In addition, a priority identifier 24 and a message identifier 25 are set in the ID area. The priority identifier 24 is used to indicate the priority level of the message 23. The message identifier 25 is used to identify the kind of message 23 assigned to the frame (in other words, the type of frame).

Transmission destination information 26 and transmission source ECU information 27a are set as required in the message identifier 25. The transmission destination information 26 indicates the transmission destination (ECU 102, 103, 104 . . . or the diagnostic tester 100) of the message 23. The transmission source ECU information 27a is used to identify the ECU 102, 103, 104 . . . that is the transmission source of the message 23.

Furthermore, within the transmission destination information 26, transmission destination ECU information 26a is used to identify the ECU 102, 103, 104 . . . that is the transmission destination of the message 23. The transmission destination ECU information 26a and the transmission source ECU information 27a include common bits (not shown) that are common among a plurality of ECUs (at least two ECUs among the ECUs 102, 103, 104 . . . ) that have been grouped in advance.

For example, in an instance in which the ECU 102 and the ECU 103 are grouped and the common bits defined in advance are the two bits "11", the transmission destination ECU information 26a and the transmission source ECU information 27a corresponding to the ECU 102 and the ECU 103 are respectively expressed as "1100001" and "1100010" in which the common bits are the two high-order bits. In addition, in an instance in which the ECU 104 does not belong to the above-described group, the transmission destination ECU information 26a and the transmission source ECU information 27a corresponding to the ECU 104 are expressed, for example, as "0000011", "0100011", or "1000011". In this way, in the transmission destination ECU information 26a and the transmission source ECU information 27a, the two high-order bits are defined as the common bits, and the remaining five bits are defined as identification bits for the ECU 102, 103, 104, . . . .

Figure 4:
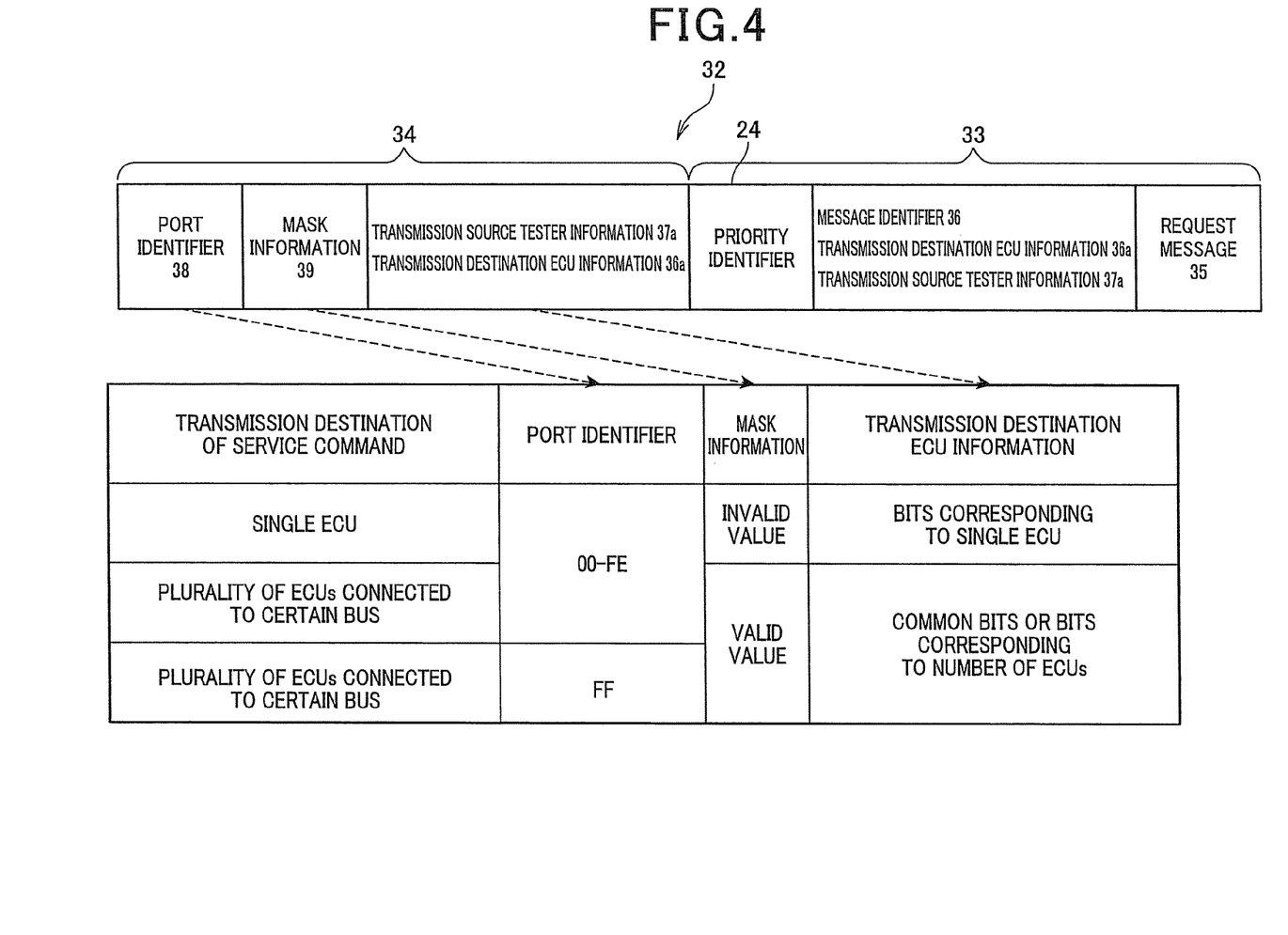
FIG. 4 shows a diagram of a configuration of a second communication frame according to the embodiment.

Next, a communication frame (referred to, hereinafter, as a "second communication frame") 32 used for transmission from the diagnostic tester 100 to the relay device 101 will be described. As shown in FIG. 4, a service command 33 and a header section 34 are set in the second communication frame 32.

The service command 33 is basically configured in a manner similar to the first communication frame 21. A message (hereinafter referred to as a "request message") 35 is set in the DT area. The request message 35 indicates a request made to the ECU 102, 103, 104, . . . to perform the self-diagnosis process, described hereafter. The priority identifier 24 and a message identifier 36 for identifying the request message 35 are set in the ID area.

In addition, transmission destination ECU information 36a and transmission source tester information 37a are set in the message identifier 36. The transmission destination ECU information 36a is used to identify the ECU 102, 103, 104 . . . that is the transmission destination of the request message 35. The transmission source tester information 37a is used to identify the diagnostic tester 100 that is the transmission source of the request message 35.

On the other hand, a port identifier 38, mask information 39, the transmission source tester information 37a, and the transmission destination ECU information 36a are set in the header section 34. The port identifier 38 is used to identify the port 121 to 123 that is the output destination of the frame. The mask information 39 is used to identify the above-described common bits.

For example, as shown in FIG. 4, in an instance in which the transmission destination of the service command 33 is a single ECU (one ECU among the ECUs 102, 103, 104 . . . ), an identifier 00-FE is assigned as the port identifier 38. The identifier 00-FE indicates the port (one port among the ports 121, 122, and 123) corresponding to the communication bus (one communication bus among the communication buses 111, 112, and 113) to which the ECU is connected. The mask information 39 is set to an invalid value indicating that common bits are not specified. The transmission destination ECU information 36a is set to seven bits of data, such as "1100001".

In addition, in an instance in which the transmission destination of the service command 33 is a plurality of ECUs connected to a certain communication bus (at least one communication bus among the communication buses 111, 112, and 113), an identifier 00-FE is assigned as the port identifier 38. The identifier 00-FE indicates the port (at least one port among the ports 121, 122, and 123) corresponding to the communication bus. The mask information 39 is set, as required, to a valid value indicating that common bits are identified. The transmission destination ECU information 36a is set to two bits of data (common bits), such as "11", or 7×N bits of data (N being an integer of 2 or more) depending on the number of ECUs.

In an instance in which the transmission destination of the service command 33 is ECUs connected to all communication buses 111, 112, and 113, the port identifier 38 is set to an identifier FF that indicates all ports 121, 122, and 123.

<ECU>

The ECUs 102, 103, 104 . . . all basically have a similar configuration. Each ECU 102, 103, 104 . . . includes a communication circuit and a microcomputer. The communication circuit is composed of a transceiver and a CAN controller. The transceiver sends data to the communication bus 111, 112, 113 . . . to which the ECU is connected and takes in data from the communication bus 111, 112, 113 . . . . The CAN controller controls communication via the on-board LAN 11, 12, 13 configured by the ECU in adherence to the known CAN protocol. The microcomputer is mainly configured by a central processing unit (CPU), a read-only memory (ROM), a random access memory (RAM), and an input/output (I/O). The microcomputer controls the CAN controller and communicates with other ECUs, thereby operating in cooperation with other ECUs and running various processes to actualize the function assigned to its own ECU. The hardware configuration of the ECU is well known and is therefore omitted from the drawings in the present specification.

Each ECU 102, 103, 104 . . . is assigned a transmission ID and a reception ID as the message identifier 25. The transmission ID is for transmitting the message 23 to other ECUs 102, 103, 104 . . . . The reception ID is for messages that the ECU itself should receive. In addition, each ECU 102, 103, 104 . . . is assigned an own ID and other ID. The own ID is for identifying the ECU itself. The other ID is for indentifying other ECUs 102, 103, 104 . . . and the diagnostic tester 100. The own ID is used as the transmission source ECU information 27a and the transmission destination ECU information 26a and 36a. The other ID is used as the transmission source ECU information 27a, the transmission source tester information 37a, and the transmission destination information 26.

When a communication frame is transmitted, the microcomputer generates the DT area that is the main body of the message and supplies the DT area to the communication circuit. The microcomputer also performs various processes in adherence to the content of the DT area supplied from the communication circuit. In particular, when the received communication frame is the service command 33, the microcomputer performs the self-diagnosis process for diagnosing failure related to on-board devices controlled by the microcomputer itself, whether or not an error related to its own various processes has occurred, and the like. The microcomputer then generates a DT area in which a response message (message 23) indicating the self-diagnosis results is written.

The communication circuit places the DT area supplied from the microcomputer in a communication frame to which the transmission ID has been added. In addition, the communication circuit receives a communication frame to which the reception ID has been added and supplies the DT area to the microcomputer. In particular, regarding the DT area in which the response message (message 23) is written, the communication circuit places the DT area in a communication frame to which a transmission ID has been added, the transmission ID including the message identifier 25 in which the other ID indicating the diagnostic tester 100 is set as the transmission destination information 26 and the own ID is set as the transmission source ECU information 27a. In addition, the communication circuit receives a communication frame to which a reception ID has been added, the reception ID in which the own ID is included in the message identifiers 25 and 36 as the transmission destination ECU information 26a and 36a. The communication circuit then supplies the DT area of the received communication frame to the microcomputer.

<Relay Device>

Figure 5:
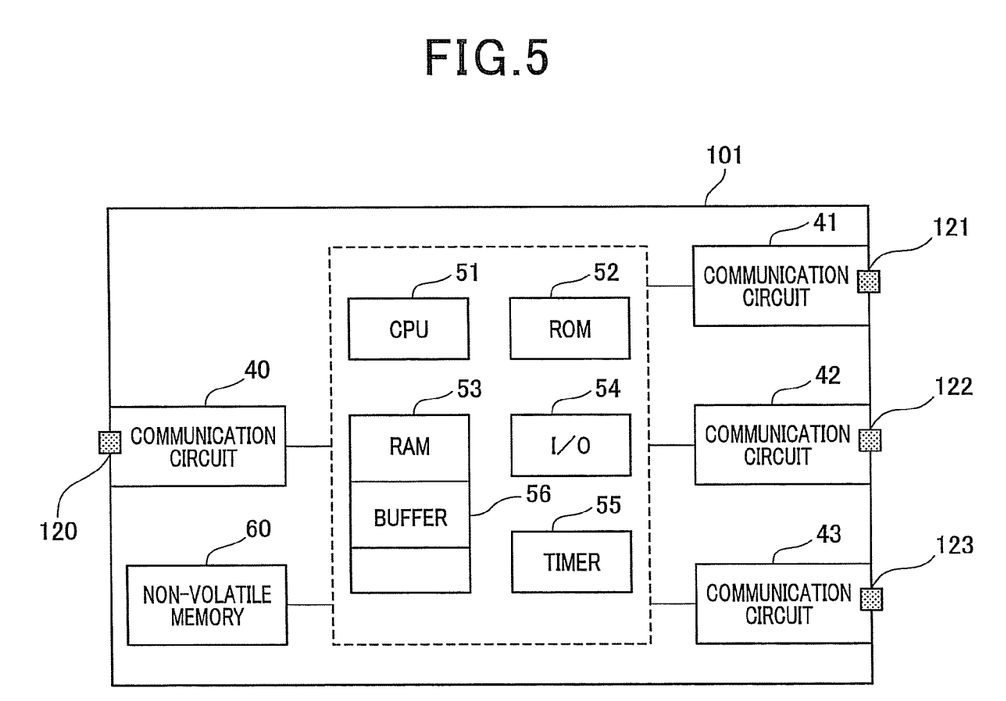
FIG. 5 shows a block diagram of a configuration of a relay device according to the embodiment.

As shown in FIG. 5, the relay device 101 includes communication circuits 40, 41, 42, and 43, and a microcomputer 50 that are basically configured in a manner similar to the communication circuit and microcomputer configuring the ECU 102, 103, 104, . . . . The relay device 101 also includes a non-volatile memory 60 that stores therein a routing table, described hereafter. The communication circuit 40 is connected to the communication bus 110 via the port 120. The communication circuits 41, 42, and 43 are respectively connected to the communication buses 111, 112, and 113 via the ports 121, 122, and 123.

Among the communication circuits 41, 42, and 43, the communication circuit 41 is assigned an ID code (relay ID) of a communication frame that is transmitted from the ECU 102, . . . connected to the first on-board LAN 11 and is required to be relayed to the second on-board LAN 12, the third on-board LAN 13, or the diagnostic tester 100. The communication circuit 42 is assigned an ID code (relay ID) of a communication frame that is transmitted from the ECU 103, . . . connected to the second on-board LAN 12 and is required to be relayed to the first on-board LAN 11, the third on-board LAN 13, or the diagnostic tester 100. The communication circuit 43 is assigned an ID code (relay ID) of a communication frame that is transmitted from the ECU 104, . . . connected to the third on-board LAN 13 and is required to be relayed to the first on-board LAN 11, the second on-board LAN 12, or the diagnostic tester 100. The communication circuits 41, 42, and 43 are each set such as to take in a communication frame having a transmission ID identical to the relay ID assigned to the communication circuit 41, 42, or 43 as a first relay frame. The communication circuits 41, 42, and 43 are also each set such as to take in a communication frame having the message identifier 25 including at least the transmission destination information 26 in which the diagnostic tester 100 is the transmission destination as a second relay frame.

The non-volatile memory 60 stores therein a routing table in which each relay ID is associated with the port identifier for identifying the port 121, 122, or 123 that is the output destination of the communication frame having the transmission ID identical to the relay ID.

The microcomputer 50 performs a first relay process in which the port identifier corresponding with the relay ID of the first relay frame taken in by the communication circuits 41, 42, and 43 is extracted from the routing table. The first relay frame is then transferred from the port (at least one port among the ports 121, 122, and 123) indicated by the extracted port identifier, via the communication circuit 41, 42, or 43.

On the other hand, the communication circuit 40 is set to receive a communication frame (second communication frame 32) having the header section 34. The microcomputer 50 performs a second relay process for relaying the communication frames transmitted and received between the diagnostic tester 100 and the ECUs 102, 103, 104 . . . .

The microcomputer 50 is a known microcomputer mainly configured by a CPU 51, a ROM 52, a RAM 53, and an I/O (Input/Output) 54. In this configuration, the CPU 51 is configured to perform the first relay process and the second relay process using the RAM 53 as a work buffer, based on a program stored in the ROM 52 or the non-volatile memory 60.

In addition, the microcomputer 50 has a timer 55 that clocks a session period after a second communication frame transmitted from the diagnostic tester 100 is received, every time the second communication frame is received. The session period is prescribed in advance as the amount of time required for the second relay process.

<Second Relay Process>

Figure 6:
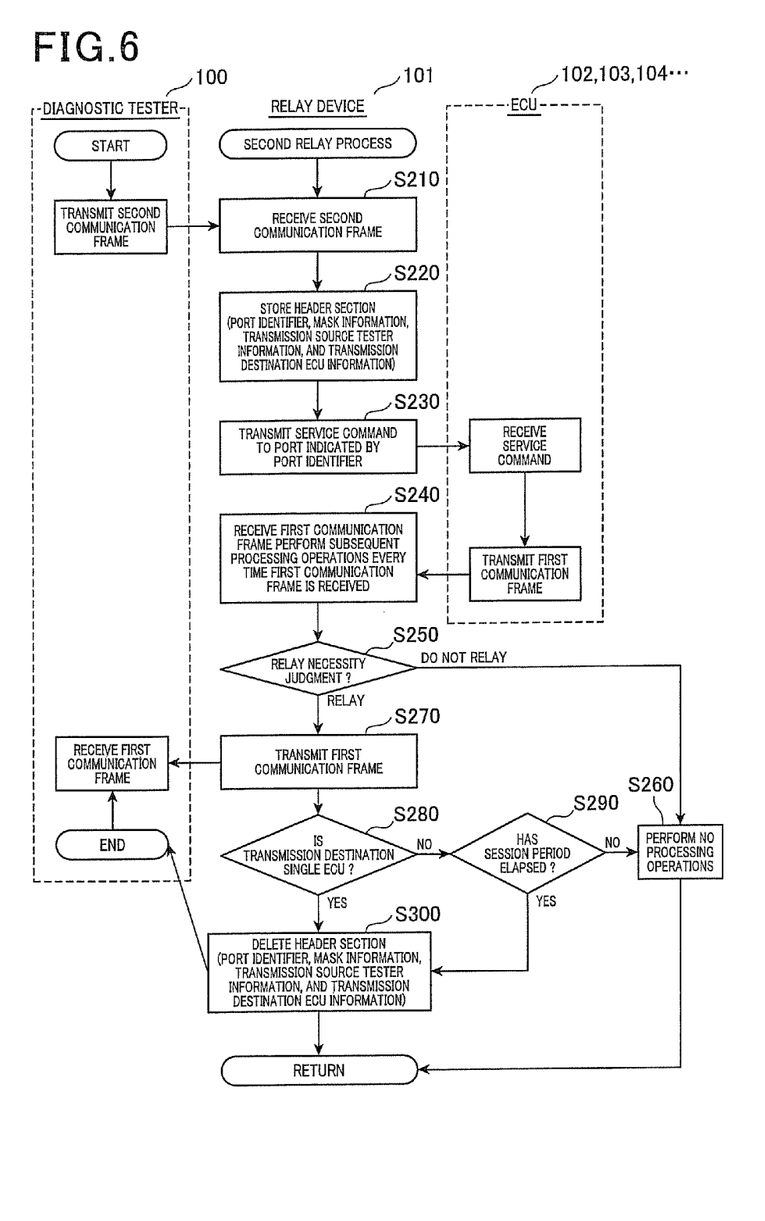
FIG. 6 shows a flowchart of the processing operations of a second relay process performed by the relay device.

Here, the processing operations of the second relay process performed by the CPU 51 of the relay device 101 will be described with reference to, the flowchart in FIG. 6. The processing operations performed by the diagnostic tester 100 and the ECU (102, 103, 104, . . . ) related to the second relay process are indicated surrounded by dotted lines in FIG. 6. Because these processing operations are not performed by the CPU 51 of the relay device 101, they are described without the use of step numbers.

The second relay process is started when, for example, the diagnostic tester 100 is connected to the communication bus 110 via a connector (not shown) provided in the vehicle. When the second relay process is started, at step S210, the CPU 51 judges whether or not the second communication frame transmitted from the diagnostic tester 100 is received via the communication circuit 40. When judged that the second communication frame is received, the CPU 51 proceeds to step S220.

At step S220, the CPU 51 extracts the header section 34 (the port identifier 38, the mask information 39, the transmission source tester information 37*a*, and the transmission destination ECU information 36*a*) from the second communication frame received at step S210 and stores the extracted header section 34 in a predetermined area (referred to hereinafter as a "buffer") 56 of the RAM 53.

At subsequent step S230, the CPU 51 extracts the service command 33 (the message identifier 36 and the request message 35) from the second communication frame received at step S210 and transmits the extracted service command 33 from the port (at least one port among the ports 121, 122, and 123) indicated by the port identifier 38 extracted at step S220, via the corresponding communication circuit (at least one communication circuit among the communication circuits 41, 42, and 43). As described above, the service command 33 has a configuration similar to that of the first communication frame 21. In addition, the message identifier 36 of the service command 33 includes the transmission destination ECU information 36*a* and the transmission source tester information 37*a* as described above. The processing operations at step S220 and step S230 are performed every time the second communication frame is received, regardless of subsequent processing operations.

Hereafter, the ECU (at least one ECU among the ECUs 102, 103, 104 . . . ) that has received the service command 33 performs the self-diagnosis process in adherence to the request message in the service command 33. The ECU then transmits the first communication frame 21 to the relay device 101. In the first communication frame 21, a response message (message 23) indicating the self-diagnosis results is added to the message identifier 25. Here, the message identifier 25 includes the transmission destination information 26 for identifying the diagnostic tester 100 and the transmission source ECU information 27*a*, as described above.

Then, at subsequent step S240, the CPU 51 judges whether or not the first communication frame 21 including the transmission destination information 26 for identifying the diagnostic tester 100 is received via the communication circuit (at least one communication circuit among the communication circuits 41, 42, and 43). Each time the CPU 51 judges that the first communication frame is received, The CPU 51 performs relay necessity judgment (step S250) and subsequent processing operations every tome the first communication frame 21 is judged to be received.

Figure 7:
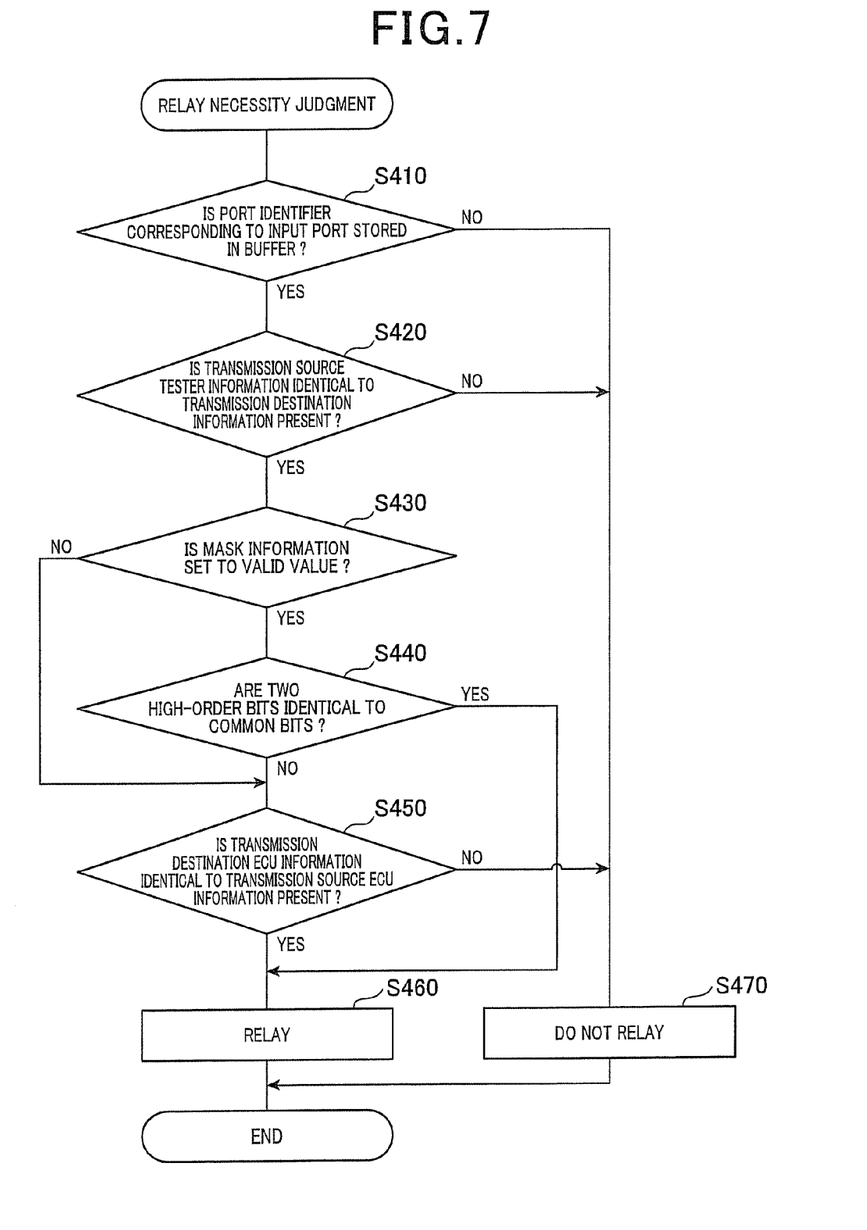
FIG. 7 shows a flowchart of the processing operations of relay necessity judgment performed by the relay device.

Here, as shown in the flow chart in FIG. 7, in the relay necessity judgment performed at step S250, first, the CPU 51 judges whether or not the header section 34 including the port identifier 38 corresponding to the port (one port among the ports 121, 122, and 123) in which the first communication frame. 21 received at step S240 has been inputted is stored in the buffer 56 (step S410). When judged "YES" at step S410, the CPU 51 proceeds to step S420. When judged "NO" at step S410, the CPU 51 eliminates (deletes) the first communication frame 21 received at step S240 and proceeds to step S470.

At step S420, the CPU 51 judges whether or not, among the at least one header section 34 applicable at step S410, the header section 34 is present that includes the transmission source tester information 37a identical to the transmission destination information 26 of the first communication frame 21 received at step S240. When judged "YES" at step S420, the CPU 51 proceeds to step S430. When judged "NO" at step S420, the CPU 51 eliminates (deletes) the first communication frame 21 received at step S240 and proceeds to step S470.

At step S430, the CPU 51 judges whether or not, among the at least one header section 34 applicable at S420, the header section 34 is present in which the mask information 39 is set to a valid value. When judged "YES" at step S430, the CPU 51 proceeds to step S440. When judged "NO" at step S430, the CPU 51 proceeds to step S450.

At step S440, the CPU 51 judges whether or not the two high-order bits of the transmission destination ECU information 36a identical to the common bits in the transmission source ECU information 27a of the first communication frame 21 received at step S240, based on the mask information 39 and the transmission destination ECU information 36a in the header section 34 applicable at step S430. When judged "YES" at step S440, the CPU 51 proceeds to step S460. When judged "NO" at step S440, the CPU 51 proceeds to step S450.

At step S450, the CPU 51 judges whether or not, among the at least one header section 34 applicable at step S430, the header section 34 including the transmission destination ECU information 36a identical to the transmission source ECU information 27a of the first communication frame 21 received at step S240 is present. When judged "YES" at step S450, the CPU 51 proceeds to step S460. When judged "NO" at step S450, the CPU 51 eliminates (deletes) the first communication frame 21 received at step S240 and proceeds to step S470.

At step S460, the CPU 51 judges that the first communication frame 21 received at step S240 is required to be relayed and proceeds to step S270. On the other hand, at step S470, the CPU 51 judges that the first communication frame 21 received at step S240 is not required to be relayed and proceeds to step S260. Returning to the flowchart in FIG. 6, at step S260 to which the CPU 51 proceeds, the CPU 51 returns to step S210 without performing the processing operations at step S260 to step S300, described hereafter.

On the other hand, at step S270, the CPU 51 transmits the first communication frame 21 (including the response message, i.e. message 23) received at step S240 to the diagnostic tester 100 via the communication bus 110 from the port 120 via the communication circuit 40. The CPU 51 then proceeds to step S280. The diagnostic tester 100 that has received the first communication frame 20 takes in the response message (message 23) from the first communication frame 21.

At step S280, the CPU 51 judges whether or not the transmission destination of the service command 33 corresponding with the first communication frame 21 transmitted at step S270 is a single ECU (one ECU among the ECUs 102, 103, 104 . . . ) based on at least one of the mask information 39 and the transmission destination ECU information 36a in the header section 34 corresponding to the first communication frame 21 transmitted at step S270. When judged "YES" at step S280, the CPU 51 proceeds to step S300. When judged "NO" at step S280, the CPU 51 proceeds to step S290.

At step S290, the CPU 51 judges whether or not the session period of the second relay process has elapsed based on the time clocked by the timer 55. When judged "YES" at step S290, the CPU 51 proceeds to step S300. When judged "NO" at step S290, the CPU 51 proceeds to step S260. At step S260 to which the CPU 51 has proceeded, the CPU 51 returns to step S210 without performing the processing operation at step S300, described hereafter.

Finally, at step S300, the CPU 51 deletes the header section 34 corresponding with the first communication frame 21 transmitted at step S270 from the buffer 56 and returns to step S210.

<Operations>

Next, operations performed by the network system 1 configured as described above will be described.

Figure 8:
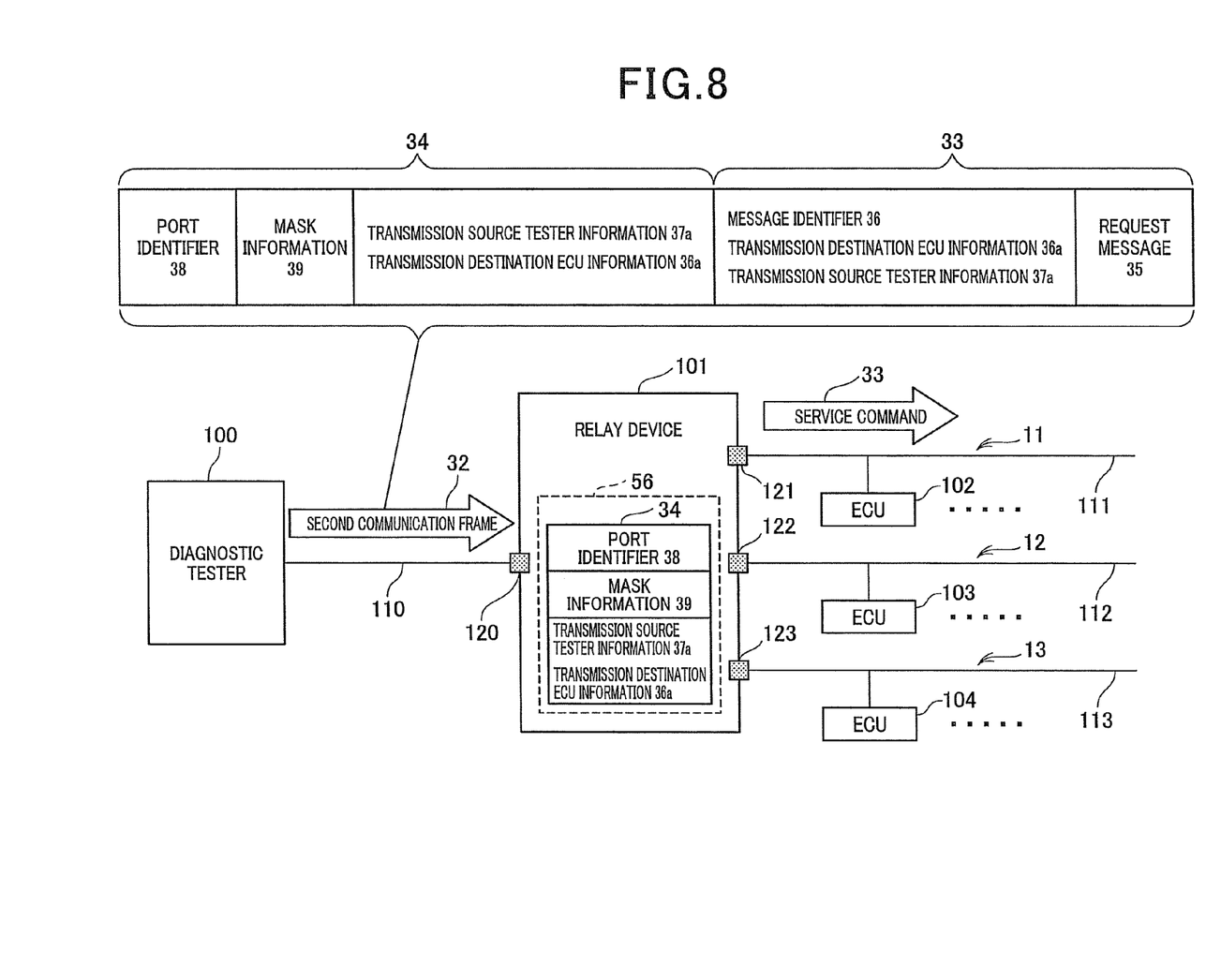
FIG. 8 shows a first diagram of exemplary operations by the network system according to the embodiment.

First, as shown in FIG. 8, the second communication frame 32 is transmitted from the diagnostic tester 100 to the relay device 101 via the port 120. When the relay device 101 receives the second communication frame 32, the relay device 101 separates the header section 34 and the service command 33 from the second communication frame 32. The relay device 101 stores the header section 34 (the port identifier 38, the mask information 39, the transmission source tester information 37a, and the transmission destination ECU information 36a) in the buffer 56.

Then, the relay device 101 sends the service command 33 from the communication port (at least one communication port among the communication ports 121, 122, and 123) indicated by the port identifier 38 in the header section 34. When the ECU (at least one ECU among the ECUs 102, 103, 104 . . . ) corresponding to the transmission destination ECU information 36a in the service command 33 receives the service command 33, the ECU performs the self-diagnosis process. The ECU then transmits the first communication frame 21 including the response message (message 23) indicating the self-diagnosis results, the transmission destination information 26, and the transmission source ECU information to the relay device 101.

Figure 9:
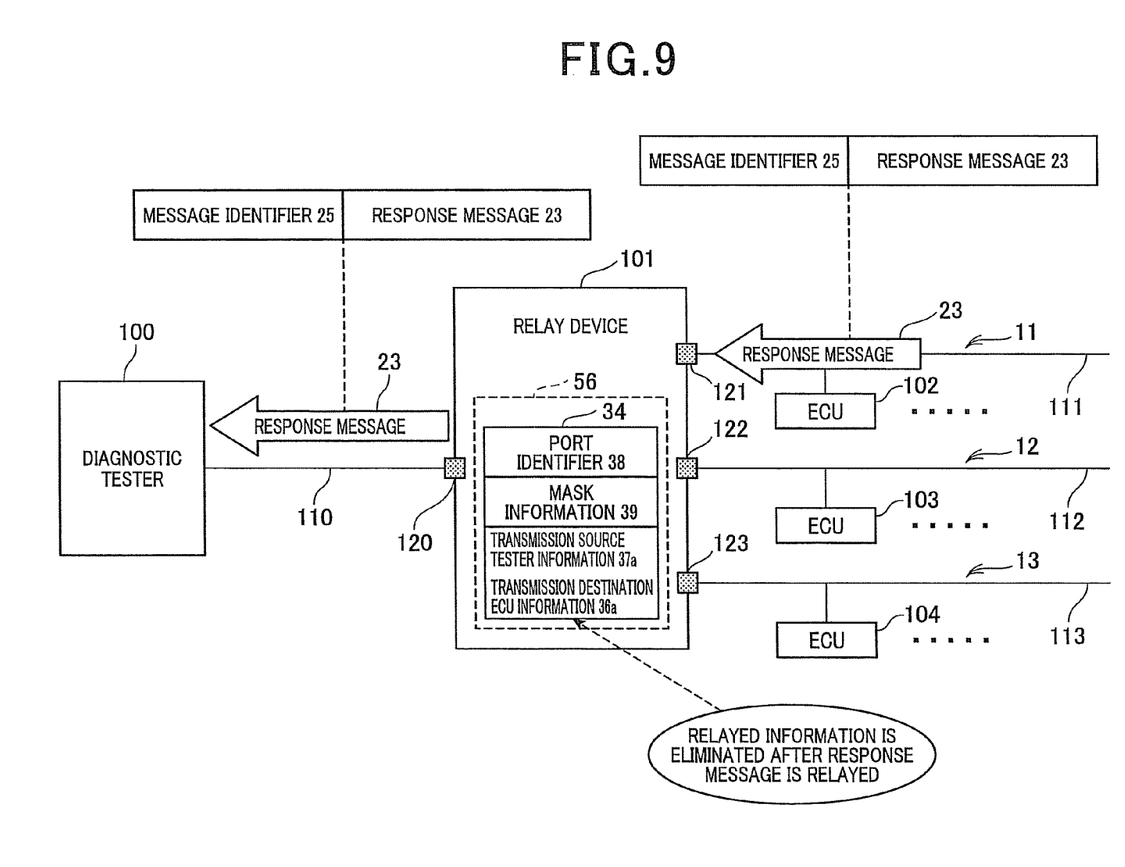
FIG. 9 shows a second diagram of exemplary operations by the network system according to the embodiment.

Here, as shown in FIG. 9, when the relay device 101 receives the first communication frame 21, the relay device 101 judges whether or not the mask information 39 in the header section 34 stored in the buffer 56 indicates a valid value. When judged that the mask information 39 indicates an invalid value, the relay device 101 judges that the transmission destination of the service command 33 is a single ECU. The relay device 101 replies to the diagnostic tester 100 with the received single communication frame 21 and eliminates (deletes) the header section 34 from the buffer 56.

Figure 10:
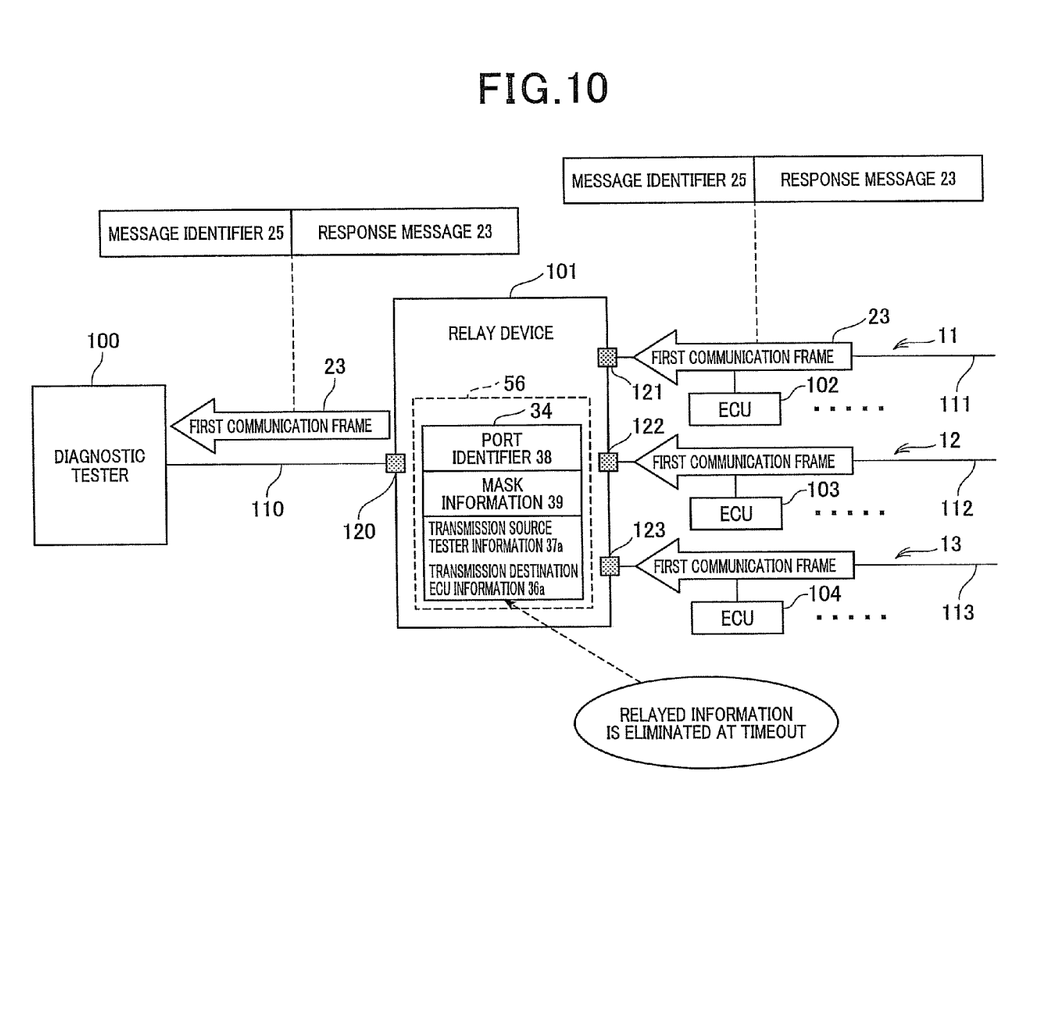
FIG. 10 shows a third diagram of exemplary operations by the network system according to the embodiment.

On the other hand, as shown in FIG. 10, when the mask information 39 in the header section 34 stored in the buffer 56 indicates a valid value, the relay device 101 judges that the transmission destination of the service command 33 is a plurality of ECUs. The relay device 101 replies to the diagnostic tester 100 with the received single first communication frame 21. The relay device 101 then replies to the diagnostic tester 100 with the first communication frame 21 every time the first communication frame 21 is received during the wait period until the session period has elapsed.

When the session period has elapsed (timed out), the relay device 101 eliminates (deletes) the relayed information from the buffer 56.

<Effects>

As described above, in the network system 1, when the relay device 101 relays a communication frame (first communication frame 21) among the on-board LANs 11, 12, and 13, the relay device 101 receives a communication frame (second communication frame 32) from the diagnostic tester 100, while using the routing table in a manner similar to that in the conventional configuration. In the second communication frame 32, the header section 34 including the port identifier 38 is added to the service command 33.

Therefore, the relay device 101 is capable of transmitting the request message 35 to the ECU connected to a predetermined on-board LAN (at least one on-board LAN among the on-board LANs 11, 12, and 13), without changing the protocols of the on-board LANs 11, 12, and 13, by transferring the service command 33 to the port (at least one port among the ports 121, 122, and 123) indicated by the port identifier 38 included in the header section 34, because the service command 33 has the same configuration as the first communication frame 21.

Therefore, in the network system 1, the relay device 101 is not required to store, in the routing table, the message identifiers 36 and 26 and the port identifiers 38 for the various request messages 35 and response messages (messages 23) transmitted and received between the diagnostic tester 100 and the on-board LANs 11, 12, and 13. Furthermore, the storage area of the non-volatile memory 60 can be conserved.

The message identifier 25 of the first communication frame 21 includes the transmission destination information 26 indicating the transmission destination of the message 23. The message identifier 36 of the second communication frame 32 includes the transmission destination ECU information 36a indicating the transmission destination of the message 35. Therefore, for example, the diagnostic tester 100 can, take in request messages 35 individually for the ECUs 102, 103, 104 . . . .

In addition, in the network system 1, the header section 34 stored in the buffer 56 of the relay device 101 includes the transmission source tester information 37a. Therefore, when the relay device 101 receives the first communication frame 21 including the response message (message 23) in response to the request message 35, the relay device 101 can eliminate (delete) the header section 34 including the transfer source tester information 37a in the buffer 56, based on the transmission destination information 26 of the first communication frame 21. As a result, the response message (message 23) addressed to the diagnostic tester 100 can be favorably relayed.

Furthermore, in the network system 1, the header section 34 stored in the buffer 56 of the relay device 101 includes the transmission destination ECU information 36a. Therefore, when the relay device 101 receives the first communication frame 21 including the response message (message 23) in response to the request message 35, the relay device 101 can eliminate (delete) the header section 34 including the transmission destination ECU information 36a in the buffer 56, based on the transmission source ECU information 27a in the first communication frame 21. As a result, the response message (message 23) from the ECU (at least one ECU among the ECUs 102, 103, 104 . . . ) designated by the diagnostic tester 100, among the response messages (messages 23) addressed to the diagnostic tester 100, can be favorably relayed.

In addition, in the network system 1, when the mask information 39 indicates a valid value in the header section 34 stored in the buffer 56 of the relay device 101, when the relay device 101 receives the first communication frame 21 including the response message (message 23) in response to the request message 35, the relay device 101 references the two high-order bits (common bits) of the transmission source ECU information 27a of the first communication frame 21 and judges whether or not the response message (message 23) is that from the ECU (at least one ECU among the ECUs 102, 103, 104. . . ) designated by the diagnostic tester 100. Therefore, the relay device 101 is not required to reference all bits of the transmission source ECU information 27a, thereby reducing the processing load on the relay device 101.

[Other Embodiments]

An embodiment of the present invention is described above. However, the present invention is not limited to the above-described embodiment. Various embodiments are possible without departing from the scope of the present invention.

For example, in the relay necessity judgment according to the above-described embodiment, the mask information 39 and the transmission destination ECU information 36a in the header section 34 are used. However, at least the transmission source tester information 37a may be used. In other words, in this instance, the header section 34 is not necessarily required to include the mask information 39 and the transmission destination ECU information 36a, and is merely required to include at least the port identifier 38 and the transmission source tester information 37a.

In addition, the network system 1 according to the above-described embodiment is described under a premise that the relay device 101 replies to the diagnostic tester 100 with the first communication frame 21 including the response message (message 23) in response to the request message 35. However, the present invention is not limited thereto. A configuration is possible in which the diagnostic tester 100 merely transmits the service command 33 to the ECU connected to a predetermined on-board LAN (at least one on-board LAN among the on-board LANs. 11, 12, and 13). In this instance, the header 34 is not necessarily required to include the transmission source tester information 37a, and is merely required to include at least the port identifier 38.

What is claimed is:

1. A network system comprising:
   a relay device that relays communication frames between on-board networks and between each of the on-board networks and an external device, wherein:
   the communication frames includes
      a message that is received by an electronic control unit configuring the on-board network, and
      a message identifier that is defined in advance for identifying the message; wherein
      a communication frame among the communication frames, which is transmitted and received within the on-board networks and between each of the on-board networks and the relay device and which is transmitted from the relay device to the external device, is regarded as a first communication frame, and
      a communication frame, which is transmitted from the external device to the relay device, is regarded as a second communication frame;
   the relay device includes a plurality of communication ports for transmitting and receiving the first and second communication frames, and stores therein a routing table in which message identifiers related to the first communication frame are associated with port identifiers each identifying a communication port indicating an output destination;

the message identifier of the first communication frame and the message identifier of the second communication frame include transmission destination information indicating a transmission destination of the message;

the external device adds the message identifier to a header portion including a port identifier identifying a particular communication port as a particular output destination and transmission source information indicating a transmission source of the message, and transmits the second communication frame to the relay device;

the relay device receives the second communication frame from the external device, stores the header portion including the port identifier and the transmission source information of the second communication frame in a buffer, and outputs the message identifier and the message of the second communication frame, as the first communication frame, to the particular communication port identified by the port identifier included in the header portion of the second communication frame, the particular communication port being connected to one of the on-board networks;

the relay device receives the first communication frame from the particular communication port connected to the one of the on-board networks and identified by the port identifier included in the header portion of the second communication frame, which includes the port identifier and the transmission source information of the second communication frame, stored in the buffer, and when the transmission source information included in the header portion, which includes the port identifier and the transmission source information of the second communication frame stored in the buffer, is identical to the transmission destination information included in the message identifier of the first communication frame, executes a deletion process to delete the header portion, including the port identifier and the transmission source information of the second communication frame stored in the buffer, from the buffer and a transmission process to transmit the first communication frame to the external device.

2. The network system according to claim 1, wherein:

the message identifier of the first communication frame includes transmission source ECU information for identifying an electronic control unit indicating a transmission source of the message;

the header portion includes transmission destination ECU information for identifying an electronic control device indicating a transmission destination source of the message; and the relay device receives the first communication frame from the particular communication port indicated by the port identifier in the header portion stored in the buffer, and when the transmission destination ECU information corresponding to the port identifier in the header portion is not identical to the transmission source ECU information included in the message identifier of the first communication frame, prohibits execution of both the deletion process and the transmission process.

3. The network system according to claim 2, wherein:

the transmission source ECU information and the transmission destination ECU information respectively includes common bits that are common among a plurality of electronic control units that have been grouped in advance;

the header portion includes mask information for identifying the common bits; and the relay device receives the first communication frame from the particular communication port indicated by the port identifier in the header portion stored in the buffer, and when the common bits specified by the mask information corresponding to the port identifier in the header portion is identical to the common bits included in the message identifier of the first communication frame, executes both the deletion process and the transmission process.

4. The network system according to claim 3, wherein the relay device immediately executes the transmission process and the deletion process when the transmission source information is identical to the transmission destination information.

5. The network system according to claim 3, wherein the deletion process is executed immediately after the transmission process.

* * * * *